(12) United States Patent
Gerber et al.

(10) Patent No.: US 9,970,451 B2
(45) Date of Patent: May 15, 2018

(54) CENTRIFUGAL COMPRESSOR HAVING LUBRICANT DISTRIBUTION SYSTEM

(71) Applicant: INGERSOLL-RAND COMPANY, Davidson, NC (US)

(72) Inventors: Thomas Edward Gerber, Williamsville, NY (US); Johnathan David Clemons, Lake View, NY (US)

(73) Assignee: Ingersoll-Rand Company, Davidson, NC (US)

( * ) Notice: Subject to any disclaimer, the term of this patent is extended or adjusted under 35 U.S.C. 154(b) by 794 days.

(21) Appl. No.: 13/906,304

(22) Filed: May 30, 2013

(65) Prior Publication Data

US 2014/0356123 A1    Dec. 4, 2014

(51) Int. Cl.
| | | |
|---|---|---|
| *F04D 29/06* | (2006.01) | |
| *F04D 29/051* | (2006.01) | |
| *F04D 29/057* | (2006.01) | |
| *F04D 29/063* | (2006.01) | |
| *F01D 25/16* | (2006.01) | |
| *F01D 25/18* | (2006.01) | |
| *F16C 33/10* | (2006.01) | |
| *F16C 17/10* | (2006.01) | |
| *F04D 29/58* | (2006.01) | |

(52) U.S. Cl.
CPC ........... *F04D 29/06* (2013.01); *F01D 25/162* (2013.01); *F01D 25/18* (2013.01); *F04D 29/057* (2013.01); *F04D 29/0513* (2013.01); *F04D 29/063* (2013.01); *F16C 17/10* (2013.01); *F16C 33/1045* (2013.01); *F04D 29/584* (2013.01); *F16C 2360/44* (2013.01)

(58) Field of Classification Search
CPC ...... F02B 39/14; F05D 2260/98; F04D 29/06; F01D 3/04
See application file for complete search history.

(56) References Cited

U.S. PATENT DOCUMENTS 2,036,152 A    3/1936 Langman
3,180,568 A *  4/1965 Oettle ................... F01D 11/003
                                                    277/412
(Continued)

FOREIGN PATENT DOCUMENTS

CN    202402326 U    8/2012
CN    202612118 U    12/2012
(Continued)

OTHER PUBLICATIONS

PCT International Search Report and Written Opinion; Application No. PCT/US2014/035712; Dated Aug. 19, 2014; 11 pages.

(Continued)

*Primary Examiner* — Woody Lee, Jr.
*Assistant Examiner* — Brian O Peters
(74) *Attorney, Agent, or Firm* — Taft. Stettinius & Hollister LLP (57) ABSTRACT

Embodiments of the present disclosure are directed towards a bearing of a rotor assembly having a first lubricant flow path configured to flow a first lubricant flow to a first bearing surface of the rotor assembly and a second lubricant flow path separate from the first lubricant flow path and configured to flow a second lubricant flow to a second bearing surface of the rotor assembly.

13 Claims, 9 Drawing Sheets

(56) References Cited

U.S. PATENT DOCUMENTS

| | | | | |
|---|---|---|---|---|
| 3,828,610 | A | * | 8/1974 | Swearingen .......... F01D 25/168 |
| | | | | 384/107 |
| 3,993,370 | A | | 11/1976 | Woollenweber |
| 4,095,857 | A | | 6/1978 | Palmer |
| 4,107,927 | A | * | 8/1978 | Gordon, Jr. .......... F01D 25/125 |
| | | | | 417/407 |
| 4,157,881 | A | * | 6/1979 | Kasuya ................ F01D 25/125 |
| | | | | 184/6.11 |
| 4,273,390 | A | * | 6/1981 | Swearingen .......... F16C 17/24 |
| | | | | 384/307 |
| 9,790,956 | B2 | * | 10/2017 | Takama ................ F04D 29/403 |
| 2005/0047690 | A1 | | 3/2005 | Keramati et al. |
| 2011/0176907 | A1 | | 7/2011 | Groves et al. |
| 2012/0038112 | A1 | | 2/2012 | Czechowski et al. |

FOREIGN PATENT DOCUMENTS

| | | |
|---|---|---|
| EP | 2428759 A2 | 3/2012 |
| GB | 1006327 A | 9/1965 |
| GB | 1370860 A | 10/1974 |
| JP | S5761817 A | 4/1982 |
| JP | 2004197848 A | 7/2004 |
| JP | 2008057452 A | 3/2008 |
| WO | 2005068847 A1 | 7/2005 |
| WO | 2011011338 A1 | 1/2011 |

OTHER PUBLICATIONS

PCT International Search Report and Written Opinion; Application No. PCT/US2014/035716; Dated Aug. 13, 2014; 10 pages.

PCT International Search Report and Written Opinion; Application No. PCT/US2014/035720; Dated Aug. 11, 2014; 11 pages.

PCT International Search Report and Written Opinion; Application No. PCT/US2014/035725; Dated Aug. 19, 2014; 11 pages.

U.S. Appl. No. 13/906,308, filed May 30, 2013, Thomas Edward Gerber.

U.S. Appl. No. 13/906,314, filed May 30, 2013, Thomas Edward Gerber.

U.S. Appl. No. 13/903,326, filed May 30, 2013, Noel D. Blair.

* cited by examiner

CENTRIFUGAL COMPRESSOR HAVING LUBRICANT DISTRIBUTION SYSTEM

BACKGROUND

The present invention generally relates to centrifugal compressors, and, more particularly, to assemblies of compressors having improved and/or reduced components and hardware.

Centrifugal compressors may supply compressed gas in a variety of industrial applications. One application of a centrifugal compressor is in plant air systems, to supply a motive force for valve actuators and pneumatic cylinders used in robotic applications, as one example. Centrifugal compressors may have an impeller mounted in a closely-conforming impeller chamber. The chamber features an axial inlet port to allow fluid entry toward the center of the impeller. Fluid is drawn into the impeller due to its rotation at speeds that can exceed 75,000 revolutions per minute (RPM). The rotation of the impeller propels the fluid through an annular diffuser passageway and into a surrounding volute. The energy imparted into the fluid by the impeller's rotation increases the fluid's velocity and, consequently, pressure as the fluid passes the diffuser passageway into the scroll or volute. Existing centrifugal compressors may include hardware that contributes to increased cost, installation, maintenance, and so forth.

BRIEF DESCRIPTION OF THE DRAWINGS

Various features, aspects, and advantages of the present invention will become better detailed description of specific embodiments

DETAILED DESCRIPTION

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed towards centrifugal compressors having components with improved features. For example, in certain embodiments, a centrifugal compressor includes a rotor assembly having one or more seals (e.g., an oil seal and/or a gas seal) which may be positioned and retained within the centrifugal compressor without hardware components. For further example, certain embodiments may include a centrifugal compressor having one or more bearing components that define multiple, separate lubricant paths. In this manner, multiple, separate lubricant flows may be routed to portions of the centrifugal compressor. As a result, lubricant flow temperature may be reduced and centrifugal compressor operation, assembly, and efficiency may be improved.

As a further example, certain embodiments of the present disclosure may include a rotor assembly with one or more bearing retainers (e.g., annular bearing retainer or ring) having at least one non-planar or "stepped" surface. More specifically, a first surface (e.g., annular surface) of a bearing retainer may have a radially inward portion and a radially outward portion, where the radially inward portion and the radially inward portion are not co-planar. Furthermore, the bearing retainer may include a second surface (e.g., annular surface) opposite the first surface that is planar. As a result, the bearing retainer may be retained within the centrifugal compressor in different positions to enable different axial positions of a bearing relative to a rotating component (e.g., a rotor). For example, the first surface (e.g., non-planar surface) may be at least partially positioned against a bearing of the rotor assembly, and the second surface (e.g., planar surface) may be positioned against a retaining bore surface of the centrifugal compressor. Alternatively, the first surface (e.g., non-planar surface) may be positioned against the retaining bore surface of the centrifugal compressor, and the second surface (e.g., planar surface) may be at least partially positioned against the bearing of the rotor assembly. In the manner described in detail below, the axial position of the bearing relative to the rotor of the rotor assembly may be adjusted based on the position of the bearing retainer, and therefore the position of the first surface (e.g., non-planar surface), within the rotor assembly.

As another example, certain embodiments may include a centrifugal compressor with a heat exchanger having an integral flow control valve. More specifically, the heat exchanger may include a cooling fluid supply head configured to flow a cooling fluid flow for transfer of heat between a gas pressurized by the centrifugal compressor and the cooling fluid flow, and the cooling fluid supply head may include an integral flow control valve configured to regulate a flow rate of the cooling fluid flow. In this manner, additional piping, hardware, and other components for the heat exchanger may be reduced, thereby improving assembly, operation, and/or maintenance of the heat exchanger and the centrifugal compressor.

Figure 1:
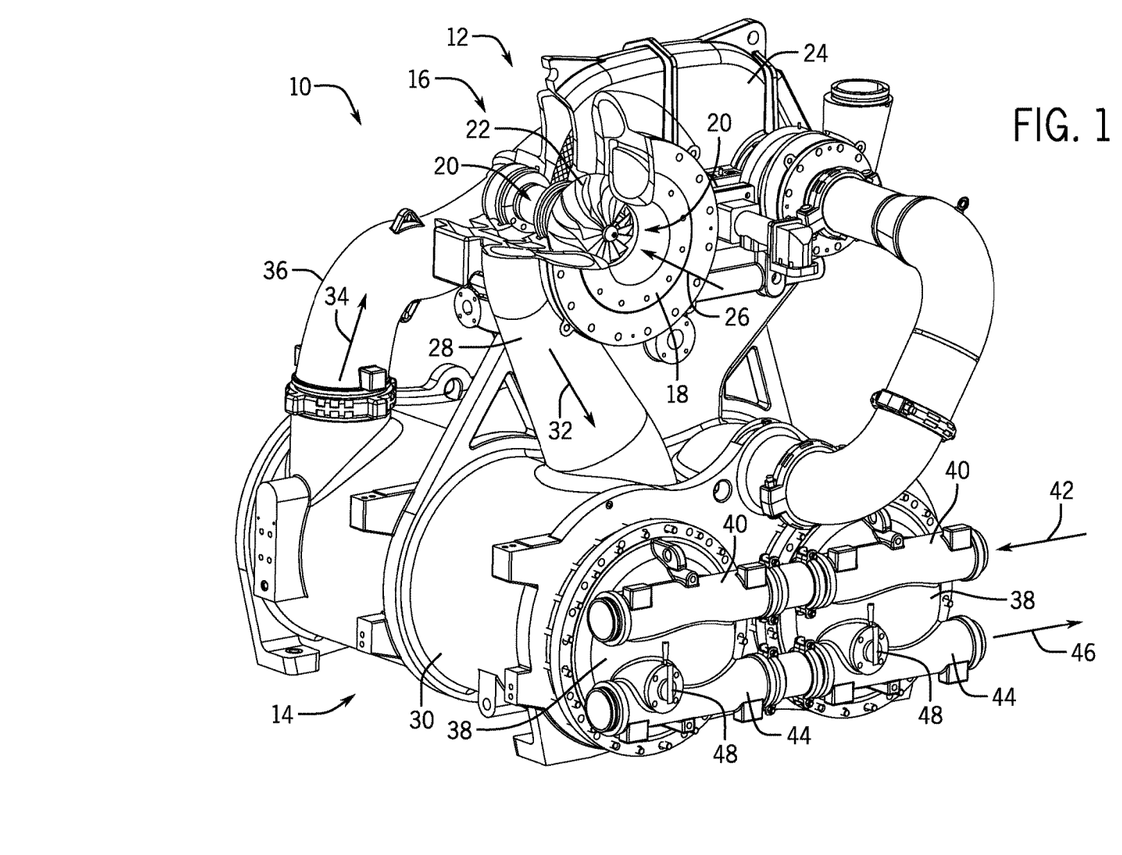
FIG. 1 is a perspective view of a centrifugal compressor having a rotor assembly, in accordance with embodiments of the present disclosure.

Turning to the drawings, FIG. 1 is a perspective view of a centrifugal compressor system 10 having improved features for improving assembly, operation, and/or maintenance of the centrifugal compressor system 10. In the illustrated embodiment, the centrifugal compressor system 10 includes a compressor 12 with an integrated heat exchanger 14. As shown, the compressor 12 includes a first stage 16. As will be appreciated, the compressor 12 may additional stages (e.g., 1, 2, 3, 4, or more additional stages) depending on the desired output flow of the compressor 12. The first stage 16 of the compressor 12 includes an inlet shroud 18 that defines an inlet 20 through which a fluid (e.g., air) may enter the first stage 16 of the compressor 12. Specifically, during operation of the compressor 12, a rotor assembly 20 of the first stage 16 rotates an impeller 22 of the compressor 12. For example, the rotor assembly 20 may be driven by a driver, such as an electric motor. In the illustrated embodiment, the compressor 12 also includes a gear box 24 that transfers power from the drive (e.g., electric motor) to the rotor assembly 20.

As mentioned above, when the impeller 22 is driven into rotation, fluid (e.g., air, natural gas, nitrogen, or another gas) is drawn into the compressor 12, as indicated by arrow 26. As the impeller 22 spins at a high rate of speed, a pressurized fluid flow is generated within the compressor 12. More specifically, a pressurized fluid flow is generated within a scroll 28 (e.g., a flow passage) of the compressor 12. To improve efficiency of the compressor 12, the pressurized fluid flow may be cooled between stages of the compressor 12. As such, the compressor 12 includes the heat exchanger 14 (e.g., an intercooler), as mentioned above, to cool the pressurized fluid flow.

In the illustrated embodiment, the scroll 28 extends to a shell 30 of the heat exchanger 14. As indicated by arrow 32, the pressurized fluid travels through the scroll 28 into the shell 30 of the heat exchanger 14, where the pressurized fluid may be cooled. Specifically, a plurality of coils positioned within the shell 30 of the heat exchanger 14 may flow a cooling fluid flow, and the pressurized fluid may pass across the plurality of coils within the shell 30. As the pressurized fluid flows across the plurality of coils, the temperature of the pressurized fluid may drop. As indicated by arrow 34, the pressurized fluid may exit the shell 30 of the heat exchanger 14 through a passage 36. From the passage 36, the pressurized fluid may flow to another stage of the compressor 12 or to another system.

As mentioned above, the heat exchanger 14 (e.g., coils positioned within the shell 30 of the heat exchanger 14) may flow a cooling fluid flow (e.g., water, refrigerant, or other cooling fluid flow). As such, the heat exchanger 14 includes cooling fluid supply heads 38. An entry conduit 40 of the cooling fluid supply heads 38 receives a cooling fluid flow, as indicated by arrow 42, from a cooling fluid source and flow the cooling fluid into the coils within the shell 30 of the heat exchanger 14. After the cooling fluid flows through the coils, the cooling fluid may exit the heat exchanger 14 through an exit conduit 44 of the cooling fluid supply heads 38, as indicated by arrow 46.

The heat exchanger 14 further includes one or more integral flow control valves 48. As discussed in detail below, the integral (e.g., integrated) flow controls valves 48 enable a reduction in hardware, piping, and other components of the heat exchanger 14. Furthermore, the integral flow control valves 48 may reduce labor during assembly and/or maintenance of the heat exchanger 14 and the centrifugal compressor system 10. In the illustrated embodiment, two integral control valves 48 are positioned along the exit conduit 44 of the cooling fluid supply heads 38. As a result, the integral control valves 48 may regulate a flow rate of the cooling fluid flow through one or more coils within the shell 30 of the heat exchanger 14.

Figure 2:
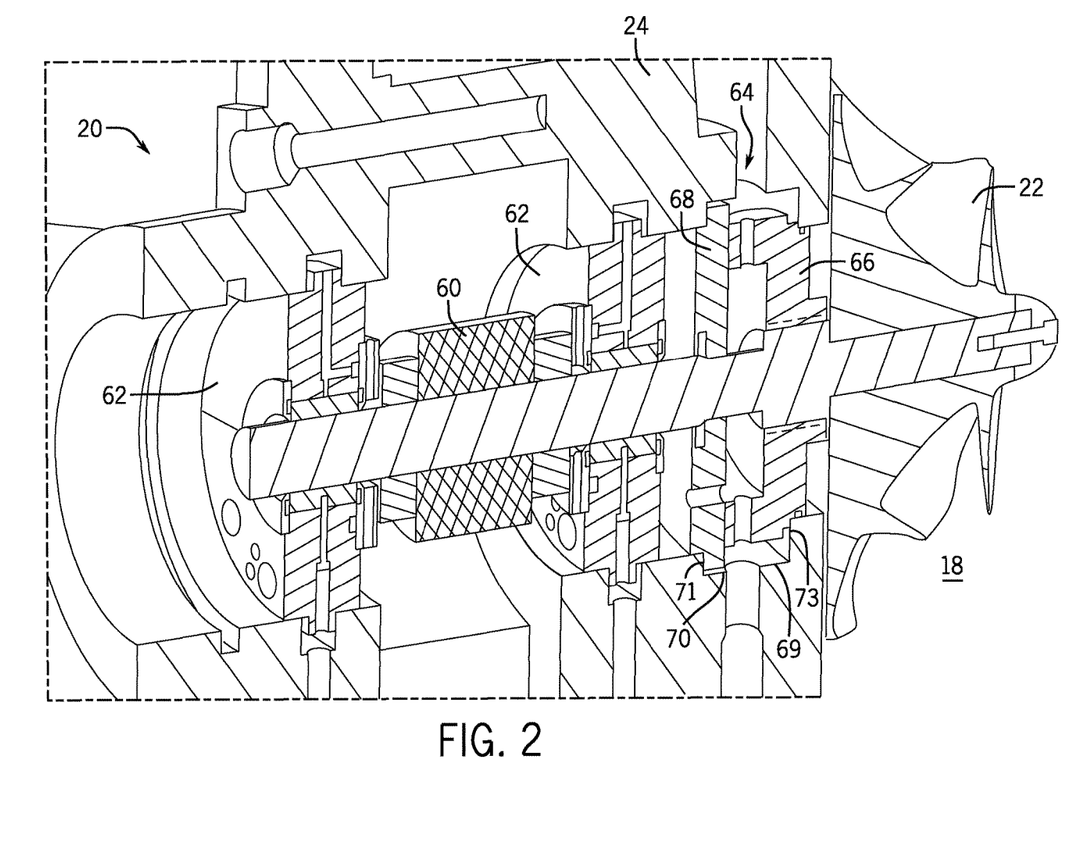
FIG. 2 is a cross-sectional view of the rotor assembly of FIG. 1, in accordance with embodiments of the present disclosure.

FIG. 2 is a cross-sectional side view of the rotor assembly 20 of FIG. 1, illustrating various components of the rotor assembly 20. For example, the rotor assembly 20 includes a rotor 60 coupled to the impeller 22. Further, the rotor 60 is supported by two bearings 62. As will be appreciated, the bearings 62 absorb loading on the rotor 60 in both radial and axial (e.g., thrust) directions. For example, the bearings 62 may support loading by creating a thin film of lubricant (e.g., oil) between the bearings, which are stationary, and the rotor 60, which is spinning. To this end, the bearings 62 may include lubricant flow paths configured to supply lubricant to various bearing surfaces between the bearings 62 and the rotor 60. More specifically, as described in detail below, each of the bearings 62 may include multiple, separate flow paths to supply separate lubricant flows to various bearing surfaces between the respective bearing 62 and the rotor 60. In this manner, cooler lubricant may be supplied to multiple bearing surfaces, thereby improving bearing 62 performance and prolonging bearing 62 life. As further discussed below, the rotor assembly 20 may also include bearing retainers (e.g., retainer rings) having at least one non-planar or "stepped" surface. As such, in the manner described below, the axial position (e.g., "float") of the bearing 62 with respect to the rotor 60 may be adjusted based on the position of the bearing retainer within the rotor assembly 20.

The rotor assembly 20 further includes a seal assembly 64 configured to block leakage of lubricant and/or fluid (e.g., pressurized air) from within the compressor 12. More specifically, in the illustrated embodiment, the seal assembly 64 includes a gas seal 66 and an oil seal 68, which may be installed without hardware. For example, the gas seal 66 and the oil seal 68 abut one another and form a geometry that mates with a bore 70 of the gear box 24. More specifically, when the gas seal 66 and the oil seal 68 are positioned adjacent one another about the rotor 60 and within the gear box 24, the gas seal 66 and the oil seal 68 may fit and be retained within the bore 70 (e.g., within an outer radial contour 69 of the bore 70) of the gear box 24. For example, the outer radial contour 69 may have a first shoulder 71 and a second shoulder 73 configured to axially retain the gas seal 66 and the oil seal 68 within the bore 70. In this manner, the gas seal 66 and the oil seal 68 may be installed and may operate with the rotor assembly 20 without additional retaining hardware. In this manner, installation, maintenance, and/or removal of the seal assembly 64 may be simplified, and installation, maintenance, and/or operating costs may be reduced.

Figure 3:
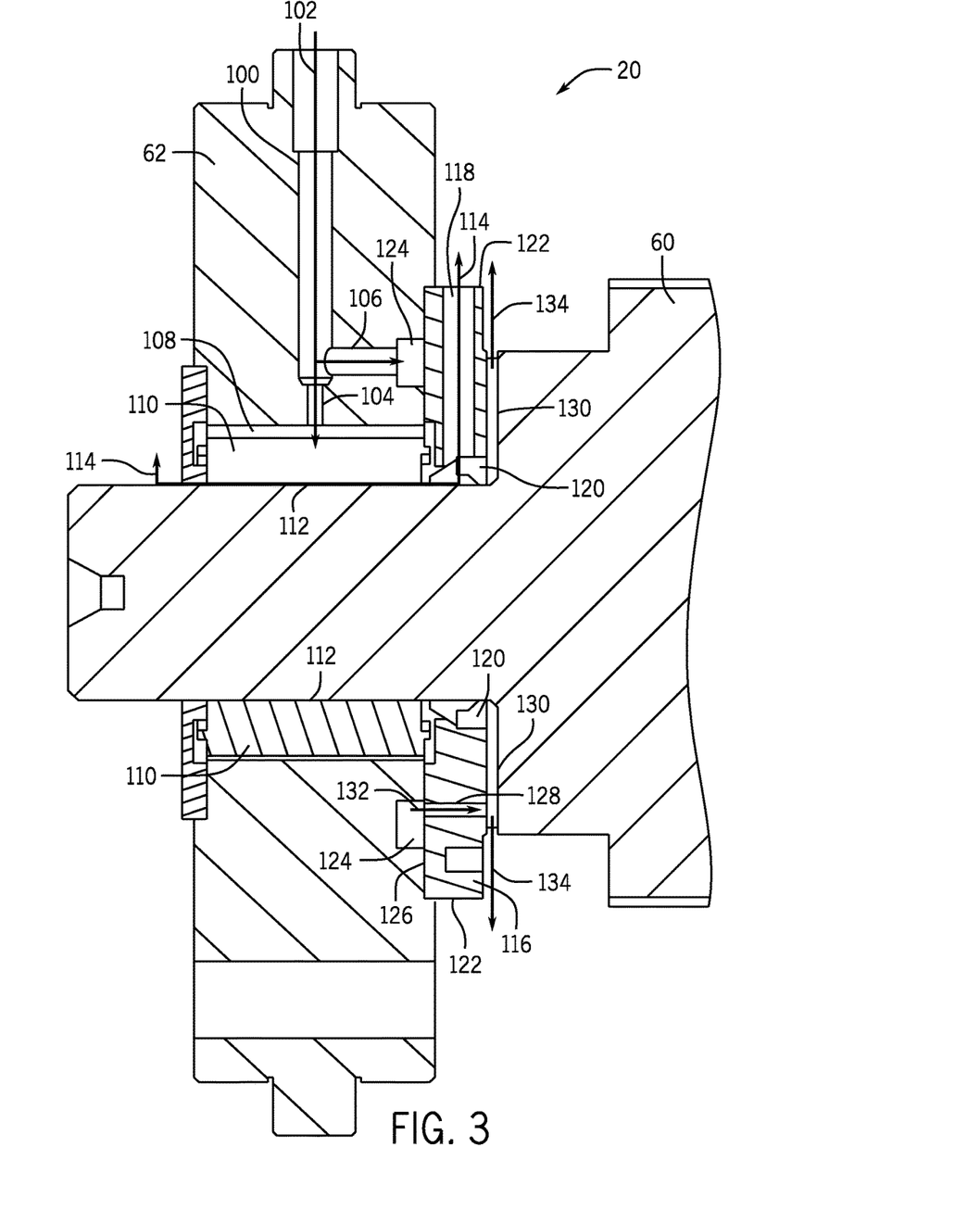
FIG. 3 is a partial cross-sectional view of the rotor assembly of FIG. 1, illustrating lubricant flow paths of the rotor assembly, in accordance with embodiments of the present disclosure.

FIG. 3 is a cross-sectional view one of the bearings 62 of the rotor assembly 20 of FIG. 1. As mentioned above, the bearing 62 may include multiple, separate flow paths for directing separate flows of lubricant to various bearing surfaces between the bearing 62 and the rotor 60. As a result, separate, cooler lubricant flows may be supplied to multiple bearing surfaces between the bearing 62 and the rotor 60, thereby improving operation and longevity of the bearing 62.

In the illustrated embodiment, the bearing 62 includes a lubricant entry port 100, whereby a lubricant flow may flow from within the gear box 224 into (e.g., radially into) the bearing 62, as indicated by arrow 102. As shown, the lubricant entry port 102 divides into two flow passages (e.g., a radial or first flow passage 104 and a second or axial flow passage 106) within the bearing 62, thereby creating two separate lubricant flows. The first flow passage 104 extends radially into the bearing 62 from the lubricant entry port 102 to a journal cavity 108 (e.g., a plurality of axial slots) of the bearing 62. As a result, lubricant may flow from the gear box 24, through the lubricant entry port 102 and the first flow passage 104 into the journal cavity 108. Within the journal cavity 108, the lubricant may contact the rotor 60 and reduce friction between the rotor 60 and the bearing 62. Specifically, the lubricant may reduce friction between the rotor 60 and bearing pads 110 (e.g., at a bearing surface 112) that are disposed within the journal cavity 108.

As indicated by arrows 114, the lubricant within the journal cavity 108 may exit the journal cavity 108 through channels and clearances between the pads 110 and the rotor 60. For example, a thrust bearing 116 disposed adjacent to the bearing 62 includes lubricant exit ports 118 that may direct lubricant from the journal cavity 108 back to the gear box 24. More specifically, the lubricant exit ports 118 are flow passages formed in the thrust bearing 116 that extend radially outward from an inner cavity 120 to a radially outward surface 122 of the thrust bearing 116. The thrust bearing 116 may include 1, 2, 3, 4, 5, 6, 7, 8, or more lubricant exit ports 118 for directing lubricant from the journal cavity 108 and back into the gear box 24.

As mentioned above, the second or axial flow passage 106 extends from the lubricant entry port 100. More specifically, the second flow passage 106 extends from the lubricant entry port 100 to an annular ring 124 formed in an axial outer surface 126 of the bearing 62. As shown, the thrust bearing 116 axially abuts the axial outer surface 126 of the bearing, and therefore abuts the annular ring 124. Furthermore, the thrust bearing 116 includes axial lubricant ports 128, which are in fluid communication with the annular ring 124. As a result, lubricant may flow from the second flow passage 106 to the annular ring 124 and through the axial lubricant ports 128 of the thrust bearing 116 to a bearing surface 130 (e.g., thrust face) between the rotor 60 and the thrust bearing 116, as indicated by arrow 132. In this manner, friction between the thrust bearing 116 and the rotor 60 at the bearing surface 130 may be reduced. Thereafter, the lubricant may flow radially outward along the bearing surface 130, as indicated by arrows 134, and the lubricant may flow back into the gear box 24.

As mentioned above, the two separate lubricant flow paths (e.g., first and second flow passages 104 and 106) enable the delivery of separate lubricant flows to different bearing surfaces (e.g., bearing surfaces 112 and 130). Specifically, the two separate lubricant flow paths may allow parallel or simultaneous flows to different bearing surfaces, whereas one flow path would result in a series arrangement (e.g., flow through one after another). The two separate, parallel lubricant flow paths enable the bearing surfaces 112 and 130 to each receive lubricant flows at lower temperatures. In other words, a single lubricant flow does not flow to both the bearing surfaces 112 and 130, which may result in an increase in lubricant temperature and a decrease in bearing 62 performance. As the first and second flow passages 104 and 106 supply separate flows of lubricant to the bearing surfaces 112 and 130 at lower temperatures, varnish and oxidation may be reduced at the bearing surfaces 112 and 130, and the load carrying capability of the bearing 62 may be increased.

Figure 4:
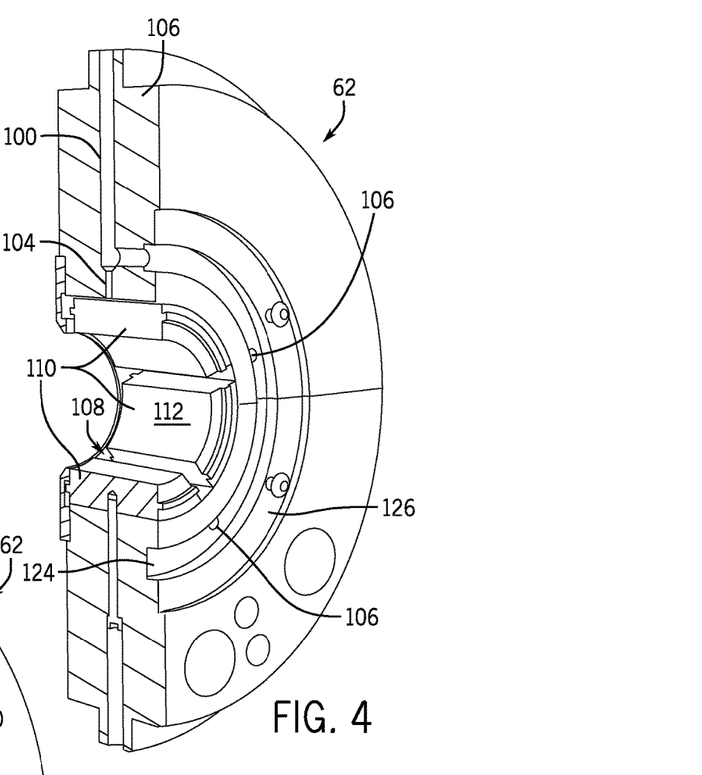
FIG. 4 is a partial cross-sectional perspective view of a bearing of the rotor assembly, illustrating lubricant flow paths of the bearing, in accordance with embodiments of the present disclosure.
Figure 5:
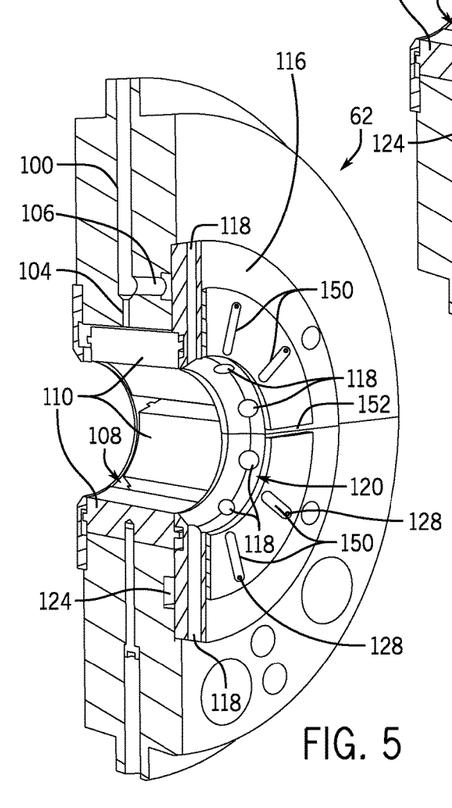
FIG. 5 is a partial cross-sectional perspective view of a bearing of the rotor assembly, illustrating lubricant flow paths of the bearing, in accordance with embodiments of the present disclosure.

FIGS. 4 and 5 are cross-sectional perspective views of the bearing 62, illustrating the first and second flow passages 104 and 106. More specifically, FIG. 4 illustrates the bearing 62 with the thrust bearing 116 removed, and FIG. 5 illustrates the thrust bearing 116 axially positioned against the bearing 62. The thrust bearing 116 may be removable from the bearing 62 to improve and simplify installation, maintenance, and removal of the thrust bearing 116, the bearing 62, and the rotor assembly 20. For example, the thrust bearing 116 may be replaced without replacing the whole bearing 62. As discussed in detail above, the first flow passage 104 supplies lubricant from the lubricant entry port 100 radially to the journal cavity 108 of the bearing 62. As shown in FIG. 4, the lubricant may flow across and between the pads 110 disposed within the journal cavity 108. In this manner, friction at the bearing surfaces 112 between the pads 110 and the rotor 60 may be reduced.

Additionally, the second flow passage 106 extends from the lubricant entry port 100 axially to the annular ring 124 formed in axial outer surface 126 of the bearing 62. From the annular ring 124, the lubricant may flow through axial lubricant ports 128 of the thrust bearing 116. As shown in FIG. 5, the axial lubricant ports 128 extend to recesses 150 (e.g., pill-shaped, oblong, or oval recesses) formed in a thrust surface 152 of the thrust bearing 116. As such, the recesses 150 may fill with lubricant and supply lubricant to the bearing surface 130 between the thrust bearing 116 and the rotor 60. Thereafter, the lubricant may flow radially outward along the bearing surface 130 and return to the gear box 24.

As will be appreciated, the number of lubricant entry ports 100 in the bearing 62 may vary. For example, in certain embodiments, the bearing 62 may include multiple (e.g., 2, 3, 4, 5, or more) lubricant entry ports 100, and each lubricant entry port 100 may be divided into the first and second flow passages 104 and 106, where each first flow passage 104 extends radially into the bearing 62 to the journal cavity 108, and each second flow passage 106 extends axially through the bearing 62 to the annular ring 124. In other embodiments, the bearing 62 may include multiple (e.g., 2, 3, 4, 5, or more) lubricant entry ports 100, and each lubricant entry port 100 may extend to either the first flow passage 104 or the second flow passage 106. In other words, each lubricant entry port 100 may flow lubricant to either the journal cavity 108 or the annular ring 124. In either embodiment, separate lubricant flows are supplied to the bearing surfaces 112 and 130. As such, the temperature of the lubricant supplied to each of the bearing surfaces 112 and 130 may be reduced, and bearing 62 performance may be improved.

Figure 6:
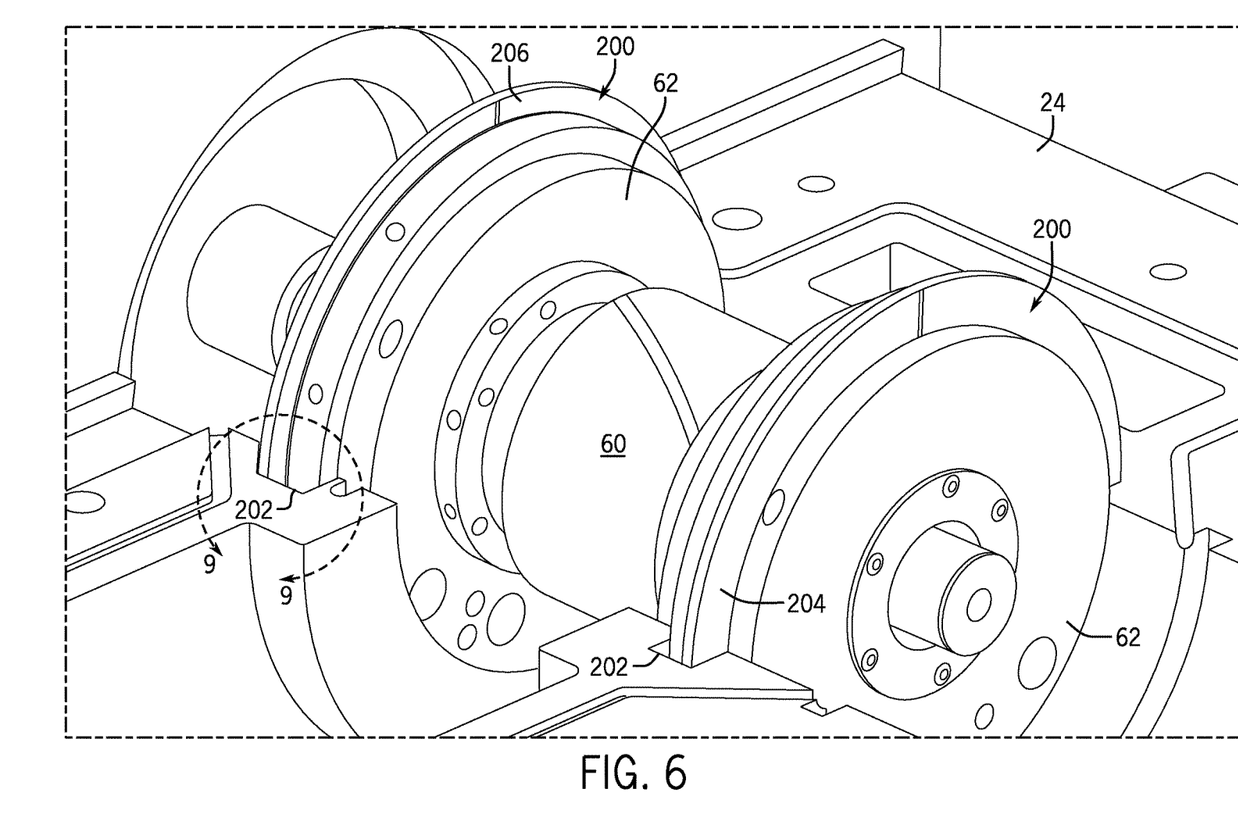
FIG. 6 is a perspective view of the rotor assembly, illustrating bearing retainers, in accordance with embodiments of the present disclosure.

FIG. 6 is a perspective view of the rotor assembly 20 disposed within the gear box 24, illustrating bearing retainers 200 (e.g., annular retainer rings or split annular retainer rings) configured to retain the bearings 62 in fixed axial positions (e.g., with respect to the rotor) within the gear box 24. More specifically, each of the bearing retainers 200 includes a non-planar or "stepped" surface. In the manner described in detail below, the axial position of the bearings 62 relative to the rotor 60 may be adjusted by changing the position or orientation of the bearing retainers 200 within the gear box 24.

As shown, each of the bearing retainers 200 is disposed within a respective bore 202 of the gear box 24 and abuts one of the bearings 62. In particular, each of the bearing retainers 200 has a bore-facing side 204, which abuts the respective bore 202 in which the bearing retainer 200 is disposed. Additionally, each of the bearing retainers 200 has a bearing-facing side 206, which abuts the respective bearing 62 that the bearing retainer 200 is supporting and/or retaining. As described below, the bearing retainers 200 may each have a non-planer or "stepped" surface or side. Additionally, each bearing retainer 200 may be positioned within the respective bore 202 such that the non-planer or "stepped" surface of the bearing retainer 200 is either the bore-facing side 204 or the bearing-facing side 206. In other words, the non-planer or "stepped" surface of the bearing retainer 200 may face the bore 202 of the gear box 24 or the bearing 62. As described below, the axial position of each bearing 62 relative to the rotor 60 may vary based on the position of its respective bearing retainer 200 within its respective bore 202.

Figure 7:
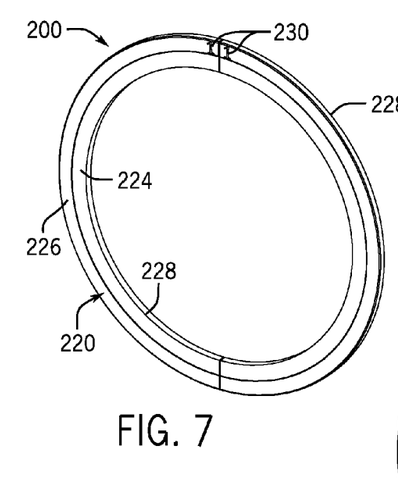
FIG. 7 is a perspective view of one of the bearing retainers of FIG. 6, in accordance with embodiments of the present disclosure.
Figure 8:
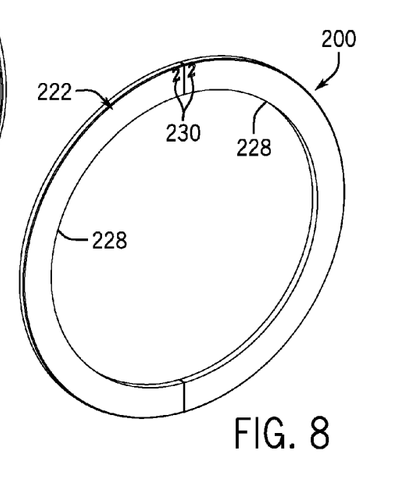
FIG. 8 is a perspective view of one of the bearing retainers of FIG. 6, in accordance with embodiments of the present disclosure.

FIGS. 7 and 8 are perspective views of the bearing retainer 200, illustrating the axial sides of the bearing retainer 200. More specifically, FIG. 7 shows a non-planar (e.g., "stepped") axial surface 220 of the bearing retainer 200, and FIG. 8 shows a planar axial surface 222 of the bearing retainer 200. As mentioned above, the orientation of the bearing retainer 200 within the gear box 24 may affect the axial position of the bearing 62 with respect to the rotor 60. That is, the axial position of the bearing 62 along the rotor assembly 20 or within the compressor 12 may be different when the non-planar axial surface 220 is the bore-facing side 204 versus when the non-planar axial surface 220 is the bearing-facing side 206.

As mentioned above, FIG. 7 shows the non-planar axial surface 220 of the bearing retainer 200. The non-planar axial surface 220 includes an inner radial surface 224 (e.g., a radially inward axial surface) and an outer radial surface 226 (e.g., a radially outward axial surface). The inner radial surface 224 and the outer radial surface 226 are both substantially planar or flat. The inner radial surface 224 and the outer radial surface 226 are also offset from one another, thereby creating the non-planar or "stepped" profile of the non-planar axial surface 220. For example, the inner radial surface 224 and the outer radial surface 226 may be offset by approximately 0.01 to 0.16, 0.02 to 0.14, 0.03 to 0.12, 0.04 to 0.10, or 0.05 to 0.08 mm.

As shown in FIG. 8, the planar axial surface 222, which is opposite the non-planar axial surface 220, is a substantially planar or flat surface. Furthermore, the bearing retainer 200 shown in FIGS. 7 and 8 has a two-piece configuration (e.g., a split ring). However, other embodiments of the bearing retainer 200 may have other numbers of segments (e.g., 3, 4, 5, or more). More specifically, in the illustrated embodiment, the bearing retainer 200 has two semi-circular halves 228 (e.g., arcuate segments), which join to form the annular ring-shape of the bearing retainer 200. In certain embodiments, one of the semi-circular halves 228 may be disposed within the gear box 24 and adjacent to the bearing 62 and another half 228 may not be used. Additionally, each half 228 of the bearing retainer 200 has a position indicator 230 on both sides (e.g., the non-planar axial surface 220 and the planar axial surface 222) of the bearing retainer 200. As shown, the position indicators 230 on the non-planar axial surface 220 of each half 228 match one another, and the position indicators 230 on the planar axial surface 222 of each half 228 match one another. For example, each half 228 of the non-planar axial surface 220 may have a first position indicator 230 set or pair (e.g., "1" and "1"), and each half 228 of the planar axial surface 222 may have a second position indicator 230 set or pair (e.g., "2" and "2"). As such, during installation of the bearing retainers 200 within the gear box 24, proper (e.g., matching) orientation of the non-planar and planar axial surfaces 220 and 222 can be determined by verifying that the position indicators 230 on each side (e.g., the non-planar axial surface 220 and the planar axial surface 222) are matching.

Figure 9:
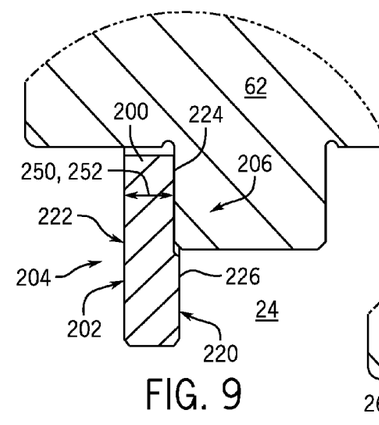
FIG. 9 is a partial cross-sectional schematic of the rotor assembly, illustrating one of the bearing retainers of FIG. 6 in a first position, in accordance with embodiments of the present disclosure.
Figure 10:
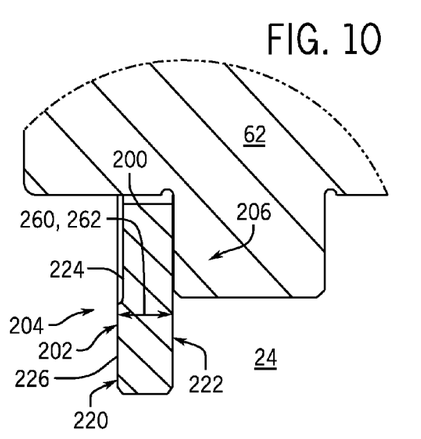
FIG. 10 is a partial cross-sectional schematic of the rotor assembly, illustrating one of the bearing retainers of FIG. 6 in a second position, in accordance with embodiments of the present disclosure.
Figure 11:
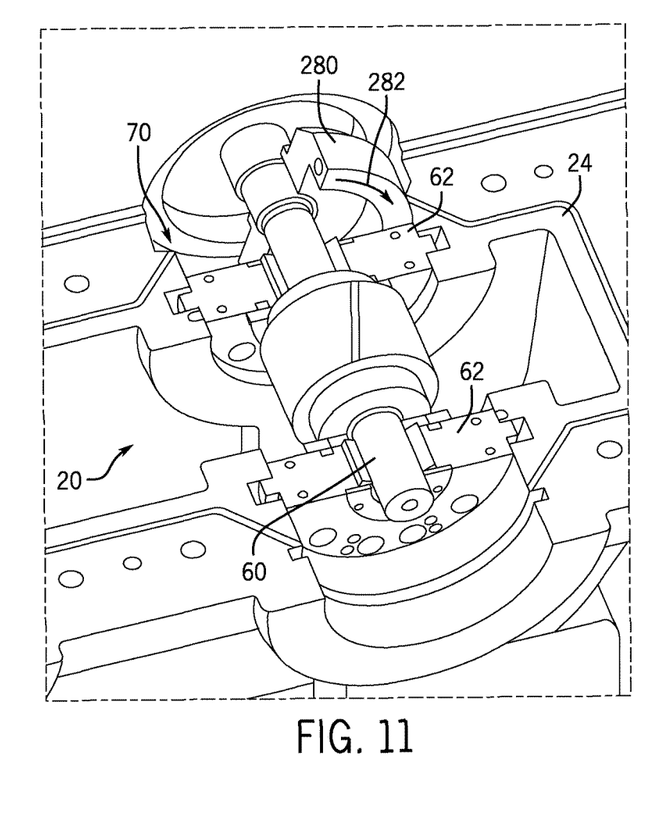
FIG. 11 is a partial cross-sectional perspective view of the rotor assembly, illustrating installation of an arcuate segment of a gas seal of the rotor assembly, in accordance with embodiments of the present disclosure.

FIGS. 9 and 10 are partial cross-sectional views of the gear box 24, illustrating different orientations or positions of the bearing retainer 200 disposed within the gear box 24. For example, FIG. 9 illustrates an embodiment where the non-planar axial surface 220 of the bearing retainer 200 is the bearing-facing side 206, and the planar axial surface 222 is the bore-facing side 204. Additionally, FIG. 10 illustrates an embodiment where the planar axial surface 222 is the bearing-facing side 206, and the non-planar axial surface 220 is the bearing-facing side 206.

As shown in FIG. 9, the non-planar axial surface 220 of the bearing retainer 200 faces the bearing 62. More specifically, the bearing 62 abuts the inner radial surface 224. The bearing 62 is retained a distance 250 from the bore 202. In other words, a thickness 252 of the bearing retainer 200 between the inner radial surface 224 and the planar axial surface 222 separates the bore 202 from the bearing 62. In FIG. 10, the planar axial surface 222 of the bearing retainer 200 faces the bearing 62. As such, the bearing is retained a distance 260 from the bore 202. In other words, a thickness 262 of the bearing retainer 200 between the outer radial surface 226 and the planar axial surface 222 separate the bore 202 from the bearing 62. As the thickness 252 is different (e.g., smaller) from the thickness 262, the axial position of the bearing 62 within the gear box 24 may be different based on the orientation of the bearing retainer 200 within the bore 202.

Rotor assemblies 20 having multiple bearing retainers 200 may have the bearing retainers 200 disposed within the gear box 24 at different orientations. That is, one bearing retainer 200 may be disposed in a first orientation within the gear box 24, and another bearing retainer 200 may be disposed in a second orientation with the gear box 24. As such, the axial position of each bearing 62 may be individually changed based on the orientation of its respective bearing retainer 200. As will be appreciated, the bearing retainer 200 simplifies the adjustment of the "float" or axial position of the bearing 62 relative to the rotor 60. For example, the disclosed bearing retainers 200 may be installed quickly and may not require custom machining at the time of installation. Additionally, the bearing retainers 200 may not require additional fasteners (e.g., threaded fasteners) for installation.

Furthermore, other processes may be simplified by using the bearing retainers 200. For example, the impeller 22 tip setting process may be simplified. For example, the inlet shroud 18 of the compressor 12 may be fixed in place, and the rotor assembly 20 and impeller 22 may be subsequently moved to contact the inlet shroud 18. As the bearing retainers 200 allow for adjustment of the bearings 62 within the gear box 24, movement of the rotor assembly 20 within the gear box 24 may be simplified.

FIGS. 11-15 are perspective views of the rotor assembly 20, illustrating an installation of the gas seal 66 and the oil seal 68. As will be appreciated, the gas seal 66 may be configured to block gas within the compressor 12 from leaking out into the atmosphere. Similarly, the oil seal 68 may be configured to block oil within the gear box 24 and compressor 12 from leaking out into the atmosphere. In certain embodiments, the gas seal 66 and/or the oil seal 68 may be labyrinth type seals. As will be appreciated, labyrinth seals may be seals that that include tortuous paths to block leakage across the seal. Additionally, the gas seal 66 and/or the oil seal 68 may include one or more coatings (e.g., a babbitted coating or other surface treatment) to help improve the sealing function of the gas seal 66 and the oil seal 68.

As mentioned above, when installed in the gear box 24, the gas seal 66 and the oil seal 68 abut one another to form a geometry that mates with the bore 70 (shown in FIG. 2) of the gear box 24. More specifically, when the gas seal 66 and the oil seal 68 are positioned adjacent one another about the rotor 60 and within the gear box 24, the gas seal 66 and the oil seal 68 may fit and be retained within the bore 70 of the gear box 24. In this manner, the gas seal 66 and the oil seal 68 may be installed and may operate with the rotor assembly 20 without additional retaining hardware (e.g., bolts, clamps, adhesives, or other mechanical retainers). In this manner, installation, maintenance, and/or removal of the seal assembly 64 may be simplified, and installation, maintenance, and/or operating costs may be reduced.

As described in detail below, the gas seal 66 and the oil seal 68 may include multiple components (e.g., a plurality of arcuate segments) that are sequentially installed within the gear box 24. For example, in FIG. 11, a first half 280 (e.g., a first arcuate segment) of the gas seal 66 is installed within the gear box 24. Specifically, the first half 280 of the gas seal 66, which has a semi-circular shape, may be positioned about the rotor 60 and rotated into the bore 70 of the gear box 24, as indicated by arrow 282. As a result, the rotor 60 and the bearings 62 may already be in place and/or installed within the gear box 24 before the gas seal 66 and the oil seal 68 are installed.

Figure 12:
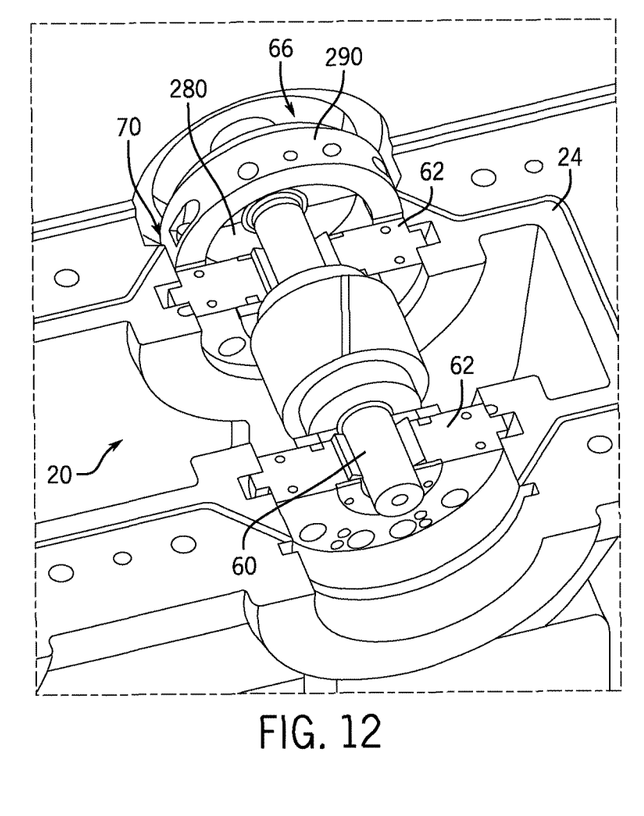
FIG. 12 is a partial cross-sectional perspective view of the rotor assembly, illustrating installation of an arcuate segment of a gas seal of the rotor assembly, in accordance with embodiments of the present disclosure.

After the first half 280 of the gas seal 66 is installed, a second half 290 (e.g., a second arcuate segment) of the gas seal 66 may be installed and positioned within the gear box 24, as shown in FIG. 12. The second half 290 of the gas seal 66 has a shape similar to the first half 280 of the gas seal 66. That is, the second half 290 of the gas seal 66 is generally semi-circular. In this manner, the first and second halves 280 and 290, when joined together as shown in FIG. 12, form the circular gas seal 66 (e.g., split gas seal).

Figure 13:
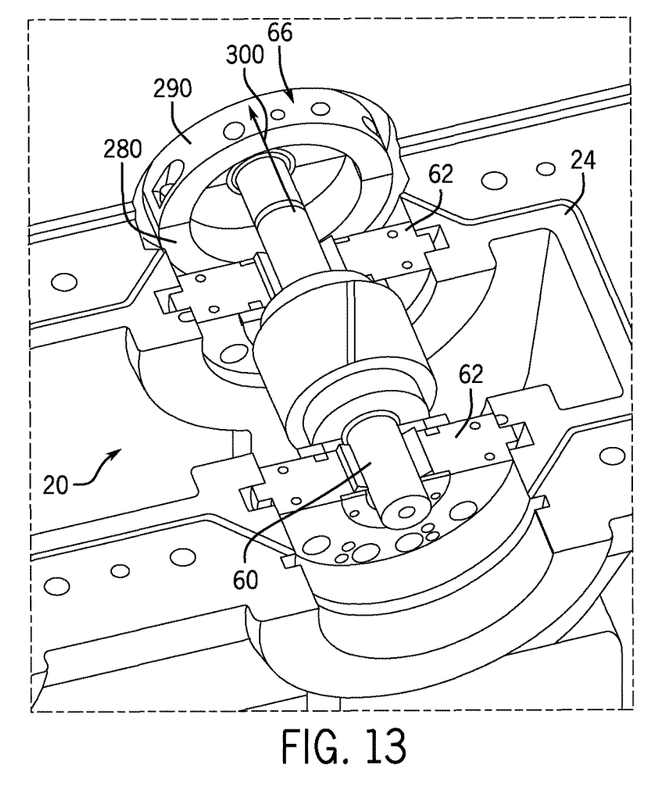
FIG. 13 is a partial cross-sectional perspective view of the rotor assembly, illustrating installation of arcuate segments of a gas seal of the rotor assembly, in accordance with embodiments of the present disclosure.
Figure 14:
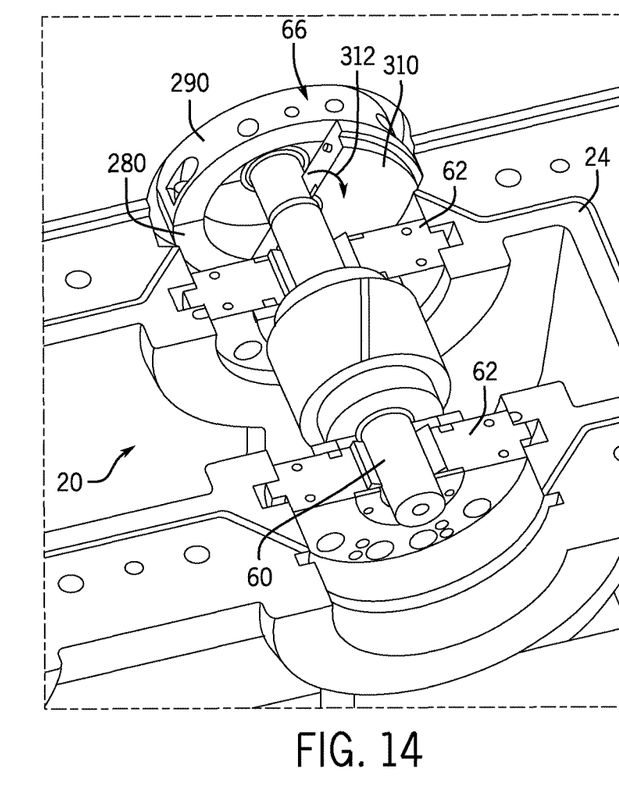
FIG. 14 is a partial cross-sectional perspective view of the rotor assembly, illustrating installation of an arcuate segment of an oil seal of the rotor assembly, in accordance with embodiments of the present disclosure.

As shown in FIG. 13, the gas seal 66 formed by the first and second halves 280 and 290 may then be axially translated further into the bore 70, as indicated by arrow 300. As shown in FIG. 14, a first half 310 (e.g., a first arcuate segment) of the oil seal 68 may be installed within the bore 70 of the gear box 24 in a manner similar to the first half 280 of the gas seal 66 described above. That is, the first half 310 of the oil seal 68, which has a generally semi-circular shape, may be rotated around the rotor 60, as indicated by arrow 312, and positioned within the bore 70 of the gear box 24.

Figure 15:
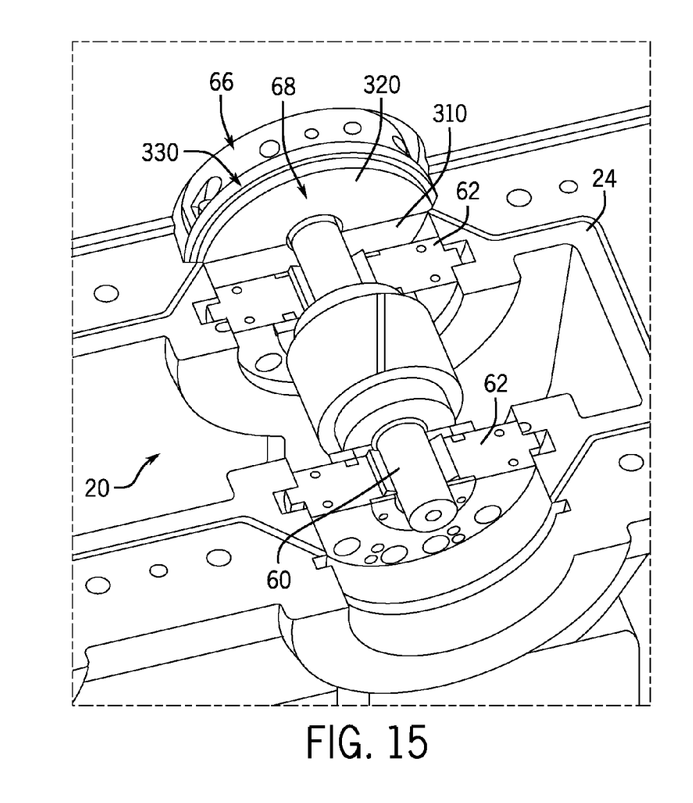
FIG. 15 is a partial cross-sectional perspective view of the rotor assembly, illustrating installation of an arcuate segment of an oil seal of the rotor assembly, in accordance with embodiments of the present disclosure.

After the first half 310 of the oil seal 68 is installed, a second half 320 (e.g., a second arcuate segment) of the oil seal 68 may be installed and positioned within the gear box 24, as shown in FIG. 15. The second half 320 of the oil seal 68 has a shape similar to the first half 310 of the oil seal 68. That is, the second half 320 of the oil seal 68 is generally semi-circular. In this manner, the first and second halves 310 and 320, when joined together as shown in FIG. 15, form the circular oil seal 68 (e.g., split oil seal). As described above, when the gas seal 66 and the oil seal 68 abut one another within the gear box 24, the gas seal 66 and the oil seal 68 form a geometry that mates with a contour (e.g., outer radial contour 69 shown in FIG. 2) of the bore 70 of the gear box 24. For example, an outer radial contour 330 of the joined gas seal 66 and oil seal 68 may form a geometry or contour that mates with the contour (e.g., outer radial contour 69) of the bore 70. As a result, the bore 70 may retain the gas seal 66 and the oil seal 68 without additional hardware or other mechanical restraints, thereby simplifying the installation, operation, and/or maintenance of the gas seal 66 and the oil seal 68.

In addition to the components described above, the gas seal 66 and/or the oil seal 68 may include other components to improve sealing between the gas seal 66, the oil seal 68, and the gear box 24 (e.g., the bore 70). For example, the gas seal 66 and/or the oil seal 68 may include o-rings, grooves, coatings, or other secondary seals to improve sealing. Furthermore, while the illustrated gas seal 66 and oil seal 68 each have first and second halves, other embodiments of the gas seal 66 and/or the oil seal 68 may comprise other numbers of sections (e.g., 1, 2, 3, 4, 5, 6, or more). As will be appreciated, the numbers of segments or sections of each of the gas seal 66 and the oil seal 68 may collectively join together to form a geometry or contour (e.g., outer radial contour 330) that may match and engage with a contour of the bore 70 of the gear box 24.

Figure 16:
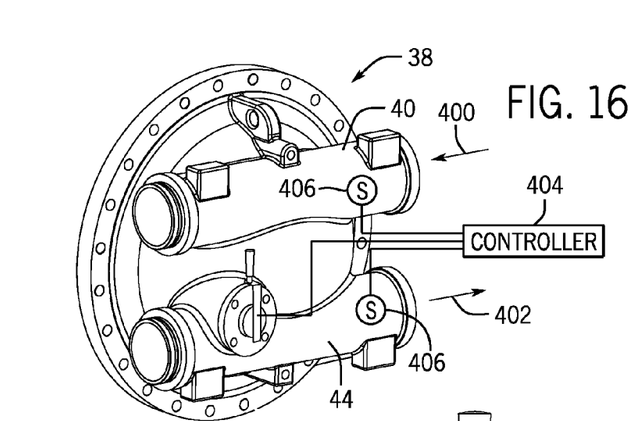
FIG. 16 is a perspective view of a water supply head of a heat exchanger of the centrifugal compressor of FIG. 1, illustrating an integral flow control valve, in accordance with embodiments of the present disclosure.

FIG. 16 is a perspective view of an embodiment of the cooling fluid supply head 38, illustrating the integral flow control valve 48 of the cooling fluid supply head 38. In certain embodiments, the cooling fluid supply head 38 may be mechanically attached (e.g., bolted) to the heat exchanger 14. In other embodiments, the cooling fluid supply head 38 may be integral (e.g., one piece) with the heat exchanger 14. As discussed above, the compressor 12 is integrated with the heat exchanger 14 for cooling the fluid (e.g., air, natural gas, nitrogen, or other gas) pressurized by the compressor. As such, coils, fins, or other conduits/contact surfaces may be positioned within the shell 30 of the heat exchanger 14, and a cooling fluid flow may be flowed through the heat exchanger 14 to cool the pressurized fluid form the compressor 12. As such, the heat exchanger 14 includes one or more cooling fluid supply heads 38 to deliver and discharge a cooling fluid flow (e.g., water, refrigerant, solvent, oil, or other cooling liquid or gas).

As similarly described above, the illustrated embodiment of the cooling fluid supply head 38 includes the entry conduit 40 and the exit conduit 44. Specifically, the entry conduit 40 may receive a cooling fluid flow (e.g., cold water), as indicated by arrow 400, and the cooling fluid flow may be flowed to piping, conduit, or other flow passage within the shell 30 of the heat exchanger 14. Similarly, after the cooling fluid flow passes through the piping, conduit, or other flow passage, the cooling fluid flow may exit through the exit conduit 44. As shown, the cooling fluid supply head 38 further includes the integral flow control valve 48. Specifically, the integral flow control valve 48 is integrated with the exit conduit 44. For example, the integral flow control valve 48 may be integrated with the cooling fluid supply head 38 (e.g., one piece), mechanically secured (e.g., bolted) to the cooling fluid supply head 38, or otherwise integral with the cooling fluid supply head 38. However, in other embodiments, the integral flow control valve 48 may be integrated with the entry conduit 40. As the integral flow control valve 48 is integrated with the cooling fluid supply head 38, external and/or additional piping, conduit, or other flow passages may be reduced.

As the integral flow control valve 48 regulates cooling fluid flow through the entry conduit 40 or the exit conduit 44, the integral flow control valve 48 regulates cooling fluid flow through the heat exchanger 14. In this manner, a rate of heat transfer between the cooling fluid flow and the fluid pressurized by the compressor 12 may be adjusted and regulated. In certain embodiments, the integral flow control valve 48 may be manually operated. In other embodiments, the integral flow control valve 48 may be automatically actuated (e.g., by a controller 404, which may have a drive or actuator to actuate the integral flow control valve 48). Furthermore, the controller 404 may actuate the integral flow control valve 48 based on feedback (e.g., sensor 406 feedback). In certain embodiments, the sensors 406 may be sensors configured to measure a temperature or flow rate of the cooling fluid flow in the entry conduit 40 or the exit conduit 44. Additionally, sensors 406 may be disposed within the compressor 12 to measure a temperature of the pressurized fluid (e.g., air) entering and/or exiting the heat exchanger 14.

Figure 17:
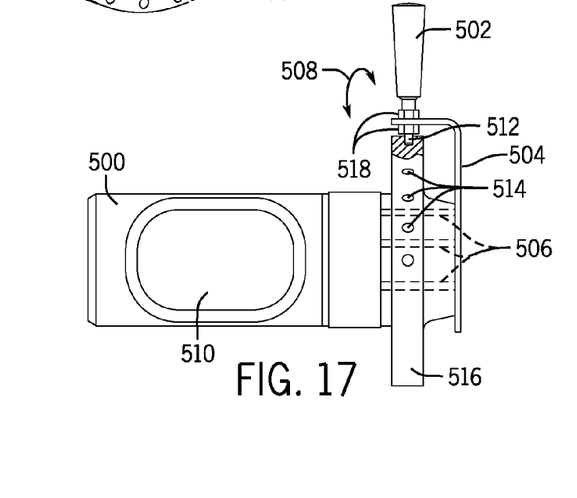
FIG. 17 is a side view of the integral control valve of FIG. 16, in accordance with embodiments of the present disclosure.

FIG. 17 is a side view of the integral flow control valve 48. Specifically, the illustrated embodiment of the integral flow control valve 48 includes a plug valve 500, which may be operated manually using a knob 502. The knob 502 is coupled to a handle 504, which is further fixed to the plug valve 500 by bolts or screws 506. As such, when the knob 502 is actuated (e.g., rotated, as indicated by arrow 508), the plug valve 500 is also rotated, thereby adjusting the flow of fluid that may pass through a flow passage 510 of the integral flow control valve 48.

The knob 502 of the integral control valve 48 is also coupled a retaining pin 512 that extends into one of a plurality of notches 514 formed in a flange 516 of the integral flow control valve 48. In this manner, the retaining pin 512 extending into one of the plurality of notches 514 may hold the integral flow control valve 48 in a particular or desired position, thereby enabling a constant flow of cooling fluid through the integral control valve 48. In the illustrated embodiment, the integral flow control valve 48 includes nuts 518, which may be adjusted (e.g., rotated) to enable retraction of the retaining pin 512 from one of the plurality of notches 514 and actuation on the knob 502. The retaining pin 512 may be spring loaded such that the retaining pin 512 is biased towards one of the plurality of notches 514. In such an embodiment, the knob 502 may be axially pulled or extended outward to release the retaining pin 512 from one of the plurality of notches 514 to enable adjustment of the integral flow control valve 48.

As discussed in detail above, embodiments of the present disclosure are directed towards the centrifugal compressor system 10 having components with improved features. For example the centrifugal compressor 12 may include the rotor assembly 20 having one or more seals (e.g., the gas seal 66 and/or the oil seal 68) which may be positioned and retained within the centrifugal compressor 12 without hardware components. As such, installation, maintenance, operation, and/or removal of the gas seal 66 and/or the oil seal 68 may be simplified. Furthermore, as fewer parts are used for installation of the gas seal 66 and the oil seal 68, equipment and maintenance costs of the compressor 12 may be reduced. The centrifugal compressor 12 may also include one or more bearing components (e.g., bearings 62 and/or thrust bearings 116) that define multiple, separate lubricant paths. For example, the first flow passage 102 flows a first, separate lubricant flow to a bearing surface (e.g., bearing surface 112) between the rotor 60 and bearing pads 110 disposed within the journal cavity 108 of the bearing 62. Additionally, the second flow passage 106 flows a second, separate lubricant flow to a bearing surface (e.g., bearing surface 130) between the rotor 60 and the thrust bearing 116. In this manner, multiple, separate lubricant flows may simultaneously flow (e.g., in parallel) to portions of the centrifugal compressor 12. As a result, lubricant flow temperature may be reduced and centrifugal compressor 12 operation, assembly, and efficiency may be improved.

Furthermore, the rotor assembly 20 may include one or more bearing retainers 200 (e.g., annular bearing retainer or ring) having at least one non-planar or "stepped" surface (e.g., non-planar axial surface 220). More specifically, a first surface (e.g., non-planar axial surface 220) of the bearing retainer 200 includes the inner radial surface 224 and the outer radial surface 226, where the inner radial surface 224 and the outer radial surface 226 are not co-planar. Furthermore, the bearing retainer 200 may include a second surface (e.g., planar axial surface 222) opposite the first surface (e.g., non-planar axial surface 220) that is planar. As a result, the bearing retainer 200 may be retained within the centrifugal compressor 12 in different positions to enable different axial positions of the bearing 62. Additionally or alternatively, the different positions of the bearing retainer 200 may enable adjustment for clearances, dimensions, and/or tolerances of the various components of the rotor assembly 20 and/or the compressor 12. For example, the non-planar axial surface 220 may be at least partially positioned against the bearing 62 of the rotor assembly 20, and the planar axial surface 222 may be positioned against the bore 202 of the gear box 24 of the centrifugal compressor 12. Alternatively, the non-planar axial surface 220 may be positioned against the bore 202 of the gear box 24 centrifugal compressor 12, and the planar axial surface 222 may be at least partially positioned against the bearing 62 of the rotor assembly 20. In this manner, the axial position of the bearing 62 relative to the rotor 60 of the rotor assembly 20 may be adjusted based on the position of the bearing retainer 200, within the gear box 24.

Moreover, the centrifugal compressor 12 may include the heat exchanger 14 having the integral flow control valve 48. More specifically, the heat exchanger 14 may includes the cooling fluid supply head 38 configured to flow a cooling fluid flow for transfer of heat between a gas pressurized by the centrifugal compressor 12 and the cooling water flow, and the cooling fluid supply header 48 may include the integral flow control valve 48 configured to regulate a flow rate of the cooling fluid flow. In this manner, additional piping, hardware, and other components for the heat exchanger 14 and the centrifugal compressor system 10 may be reduced, thereby improving assembly, operation, and/or maintenance of the heat exchanger 14 and the centrifugal compressor system 10.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A compressor, comprising:
a gear box;
a rotor assembly including a rotor; and
a bearing of the rotor assembly including a radial bearing pad and a stationary thrust bearing, comprising:
   a lubricant entry port extending radially inward from an outer wall of the bearing;
   a first lubricant flow path extending from the entry port configured to flow a first lubricant flow to a first bearing surface of the bearing between the rotor and the radial bearing pad;
   a second lubricant flow path extending from the entry port separate from the first lubricant flow path and configured to flow a second lubricant flow to a second bearing surface of the bearing between the rotor and the thrust bearing; and
   wherein the first lubricant flow path and the second lubricant flow path merge together after exiting from first and second exit flow paths formed from at least portions of the thrust bearing.

2. The compressor of claim 1, further comprising:
a first exit flow port formed in a portion of the thrust bearing in fluid communication with the first flow path;
an annular ring formed in the bearing downstream of the second lubricant flow path and adjacent the thrust bearing; and
wherein a second exit flow port is in fluid communication with the annular ring and extends between the thrust bearing and the rotor.

3. A system, comprising:
a main bearing;
a thrust bearing disposed adjacent to the main bearing;
a first lubricant flow path extending from a lubricant entry port of the main bearing to a first bearing surface between the main bearing and a rotor;
a second lubricant flow path separate from the first lubricant flow path extending from the lubricant entry port of the main bearing to a second bearing surface between the thrust bearing and the rotor;
wherein the first lubricant flow path extends from the lubricant entry port radially through the main bearing and into a journal cavity of the main bearing;
wherein the first bearing surface comprises a surface between a bearing pad disposed within the journal cavity and the rotor;
wherein the first lubricant flow path extends from the journal cavity, through an inner cavity of the thrust bearing, and through one of a plurality of first lubricant exit ports extending through the thrust bearing radially outward from the inner cavity; and
wherein lubricant in the first and second flow paths merge downstream of the main bearing and thrust bearing after discharging from the first and second exit ports formed with portions of the thrust bearing.

4. The system of claim 3, wherein main bearing is configured to receive the rotor of a centrifugal compressor.

5. The system of claim 3, wherein the second lubricant flow path extends from the lubricant entry port axially through the main bearing and into an annular recess formed in an axial outer surface of the main bearing.

6. The system of claim 5, wherein the thrust bearing comprises a plurality of axial lubricant ports fluidly coupled to the annular recess, and each of the plurality of axial lubricant ports extends to the second bearing surface.

7. The system of claim 6, wherein the second bearing surface comprises a surface between the thrust bearing and the rotor.

8. The system of claim 3, comprising a gear box configured to supply the lubricant to the lubricant entry port.

9. The system of claim 3, wherein the thrust bearing is removable from the main bearing.

10. A method, comprising:
flowing a first lubricant flow from a lubricant entry port of a main bearing to a first bearing surface of the main bearing adjacent a first rotor surface through a first lubricant flow path;
flowing a second lubricant flow from the lubricant entry port to a second bearing surface of a thrust bearing adjacent a second rotor surface through a second lubricant flow path split off from the first lubricant flow path in the main bearing;
flowing the first lubricant flow from the first bearing surface through a plurality of first exit ports extending radially through the thrust bearing;
flowing the second lubricant flow from the second bearing surface through a second exit port formed with the thrust bearing;
wherein the first lubricant flow path and the second lubricant flow path are separate from one another; and
merging lubricant from the first and second flow paths after exiting through the first and second exit ports.

11. The method of claim 10, wherein the lubricant entry port is in fluid communication with a gear box of a compressor.

12. The method of claim 11, wherein the first lubricant flow path extends radially from the lubricant entry port and into a journal cavity of the main bearing, and the second lubricant flow path extends axially from the lubricant entry port and into an annular ring formed in an outer axial surface of the main bearing.

13. The method of claim 12, comprising flowing the second lubricant flow from the annular ring, through the axial lubricant ports of the thrust bearing, to the second bearing surface.

* * * * *